United States Patent [19]
Pistemaa

[11] Patent Number: 5,877,598
[45] Date of Patent: *Mar. 2, 1999

[54] HORIZONTAL LINEARITY CONTROL

[75] Inventor: Jari Pistemaa, Salo, Finland

[73] Assignee: Nokia Technology GmbH, Pforzheim, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 843,619

[22] Filed: Apr. 10, 1997

[30] Foreign Application Priority Data

Apr. 12, 1996 [FI] Finland ................................ 961620

[51] Int. Cl.$^6$ ............................................ G09G 1/04
[52] U.S. Cl. ........................................................ 315/370
[58] Field of Search .................................. 315/370, 371, 315/395

[56] References Cited

U.S. PATENT DOCUMENTS

| | | | |
|---|---|---|---|
| 4,761,586 | 8/1988 | Wharton | 315/408 |
| 5,179,322 | 1/1993 | Gibbs et al. | 315/370 |
| 5,268,618 | 12/1993 | Chen | 315/370 |
| 5,434,483 | 7/1995 | Yang et al. | 315/371 |

*Primary Examiner*—Gregory C. Issing
*Attorney, Agent, or Firm*—Ware, Fressola, Van Dur Sluys & Adolphson LLP

[57] ABSTRACT

The invention relates to the controlling of picture tubes used in television sets and monitors, more specifically to the linearization of their horizontal sweep. In the system according to the invention, linearization is performed using a linearization coil (L3) equipped with a control winding (L4) and the effective inductance of the linearization coil is adjusted by changing the impedance (Z) that serves as the control winding load.

11 Claims, 4 Drawing Sheets

HORIZONTAL LINEARITY CONTROL

BACKGROUND OF THE INVENTION

1. Technical Field of the Invention

The invention relates to the controlling of picture tubes used in monitors and television sets, more specifically to the linearization of their horizontal sweep.

2. Description of the Related Art

In picture tubes, the distance from the picture tube electron gun to various positions of the screen varies according to the deflection angle of the electron beam. Therefore, the position to which the electron beam points does not move at an even pace but more quickly by the edges of the screen and more slowly at the center of the screen if the electron beam is deflected by a steadily varying signal according to FIG. 1, in which case the patterns displayed on the screen will be distorted. In FIG. 1, the actual sweep period is the time between $t_1$ and $t_0$. The distortion is corrected using vertical and horizontal linearization, wherein the waveform of the signal controlling the electron beam is formed such that the angle of the electron beam changes in the border areas of the screen more rapidly than in the center, thus making the pixel formed by the electron beam to move evenly. Such a waveform is illustrated in FIG. 2.

The horizontal sweep current can be generated e.g. with the known basic construction illustrated in FIG. 3, disclosed in the Electronic Design, Jan. 4, 1973. In this circuit, during the second half of the sweep period, the transistor conducts and C2 acts as the energy source. At time to the deflection current through the deflection coil L1 reaches its negative peak and at the same time the transistor stops conducting and the retrace period begins. The energy stored in coil L2 builds up a sinusoidal voltage across the sweep capacitor C1. When this voltage returns to zero at time $t_1$, Diode D1 begins to conduct and the sweep period begins again. The deflection coil L1 acts again as the energy source until time $t_2$. At time $t_2$ the current polarity reverses, the Diode stops conducting and the transistor starts conducting. Capacitor C2 is now the energy source until time $t_0$.

The circuit described above generates in an ideal case a waveform according to FIG. 2. The differences between this waveform and the waveform of FIG. 1 are caused mainly by capacitor C2, this is why capacitor C2 is called an S-correction capacitor. Real components, however, have losses which make the curve asymmetric. The asymmetry can be removed e.g. by bringing in an external correction current to the deflection circuit via a transformer, for example. Disadvantages of this approach include the relative complexity and expansiveness of the circuits required to generate the correction current and feed it to the deflection circuit.

A generally used loss compensation method is to use a so-called linearization coil in addition to a deflection coil, connected in series with it, for example. The linearization coil is a coil the inductance of which depends on the current flowing through it. Such a coil can be made by using a ferromagnetic core in the coil and, in addition, a biasing magnet. FIG. 4 shows the optimum-shaped current-inductance curve to produce the correct sweep shape for such a linearization coil. This kind of solution according to a simple principle functions well when the line frequency is constant, as in television receivers. The waveform correction produced by the linearization circuit can then be tuned to correspond to the line frequency in use by moving the biasing magnet, which effectively moves the inductance curve in the direction of the current axis in FIG. 4.

In monitors, the situation is more complex because they can use many different line frequencies and therefore the inductance of the linearization coil must be changeable according to the line frequency. Such a solution can be implemented by using a FET transistor to connect a second coil in parallel with the linearization coil and using the FET transistor to direct part of the sweep current past the linearization coil. The disadvantage of this kind of solution is that it requires many additional coils and FET transistors, depending on the number of line frequencies used in the monitor. Generally, however, to save costs, only one additional coil and FET is used.

Nowadays, a more commonly used solution is to use a linearization coil including a control winding, wherein direct current is brought to the control winding to compensate for the biasing magnet field of the linearization coil in order to change the inductance at the ends of the linearization coil. The current through the control winding and thus the inductance of the linearization coil can be changed according to the line frequency in use. In this solution, the disadvantage is that the curved shape of the current-inductance curve is not retained, as shown in FIG. 5 where the curvature is shown flattened or substantially reduced in curvature, which causes nonlinearities in the monitor display.

In addition, the tuning of the linearization circuits must be very accurate. Variation of characteristics of new component lots, even within the normal tolerances, may affect the tuning so much that the produced circuit has to be separately tuned after manufacturing. As far as devices with fixed coils are concerned, one has to either reduce turns in the linearization coil or add extra coils in parallel with the linearization coil.

SUMMARY OF THE INVENTION

An object of the invention is to arrange the adjustment of the linearization circuit such that the shape of the current-inductance curve of the linearization coil will be generally retained and not substantially changed and thus the tuning of the linearization circuit will not cause nonlinearity in the horizontal deflection. Another object of the invention is to make the tuning of the linearization circuit simple, using as few components as possible.

These objects are achieved by using electromotive force induced in the control winding. In the system according to the invention, no electric current is brought to the control winding but a suitable impedance load is placed on the winding.

The system according to the invention is characterized in that the inductance of the linearization coil is made changeable so that the shape of the current-inductance curve of the linearization coil will not change substantially and will be generally retained.

The invention is also directed to a method wherein the effective inductance of the linearization coil is adjusted in a manner so that the shape of the current-inductance curve of the linearization coil is substantially retained.

BRIEF DESCRIPTION OF THE DRAWING

The invention is described in further detail with reference to the advantageous embodiments presented as illustrative examples and the accompanying drawing wherein.

In the drawing, like parts are designated by like reference numbers and markings.

DETAILED DESCRIPTION OF PREFERRED EMBODIMENTS

The operation of the invention can be described as follows. The varying current in the linearization coil produces a varying magnetic flux in the ferrite core. The flux cutting the control winding induces a certain electromotive force in the winding. When an impedance is connected to the control winding as a load, a current starts flowing through it. The flux generated by this current works in the ferrite core against the flux caused by the linearization coil. Therefore, the main flux produced by the linearization coil attempts to become smaller, but since at the moment the voltage of the linearization coil is (momentarily) substantially constant, the flux cannot be reduced because the counter-electromotive force caused by self-induction is always so large that it cancels the voltage feeding the coil. As a result, the voltage of the linearization coil feeds additional current to the coil. As the magnetic circuit is made of a ferromagnetic material, the circuit inductance is not constant but depends on the current.

Figure 1:
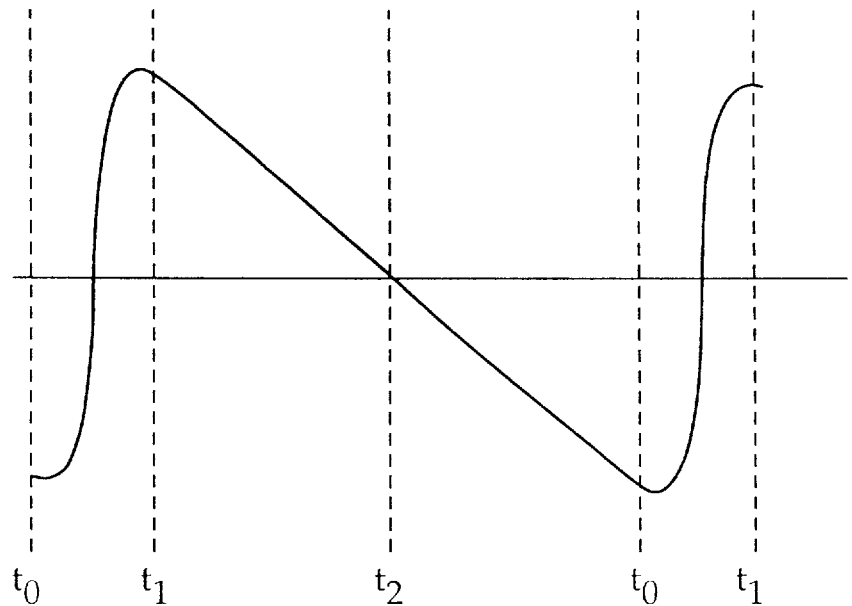
FIG. 1 shows the curve of a nonlinearized horizontal sweep current.
Figure 2:
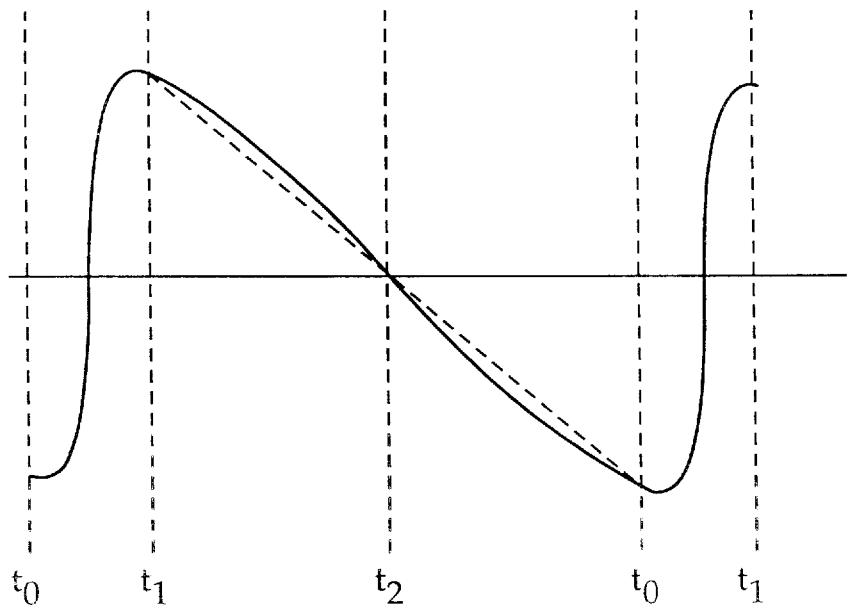
FIG. 2 shows the curve of a horizontal sweep current needed for linear horizontal sweep.
Figure 3:
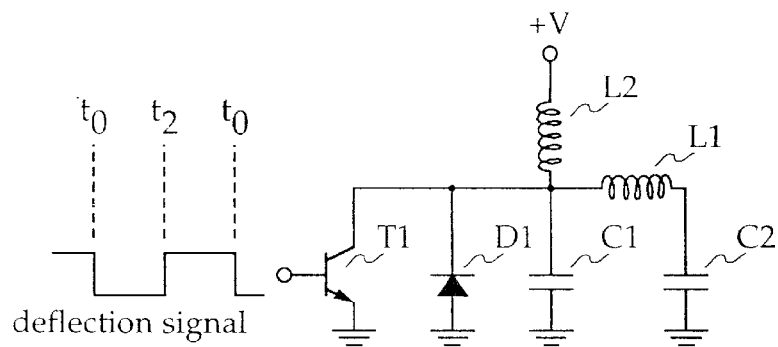
FIG. 3 shows diagrammatically the construction of a circuit producing a horizontal sweep according to the prior art.
Figure 6:
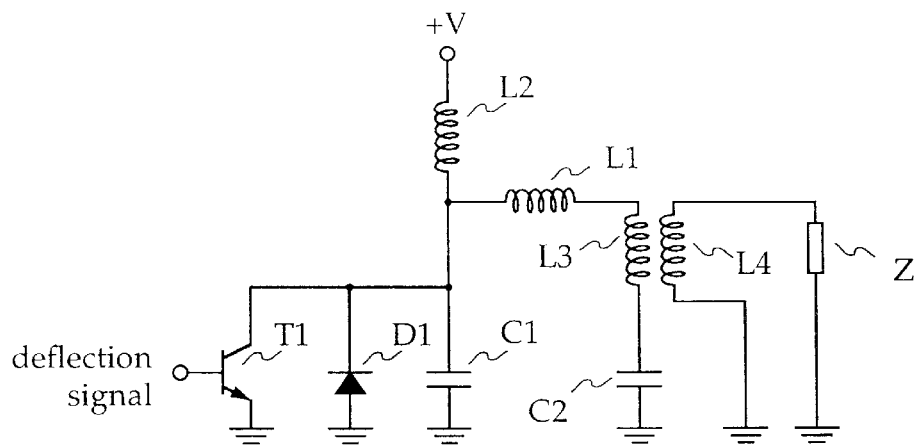
FIG. 6 shows diagrammatically the linearization solution according to the invention.

FIG. 6 shows the solution according to the invention applied to the basic circuit shown in FIG. 3. A linearization coil L3 is connected in series with the horizontal deflection coil L1 and the inductance of the linearization coil is adjusted by means of a control winding L4 and impedance Z.

Figure 7:
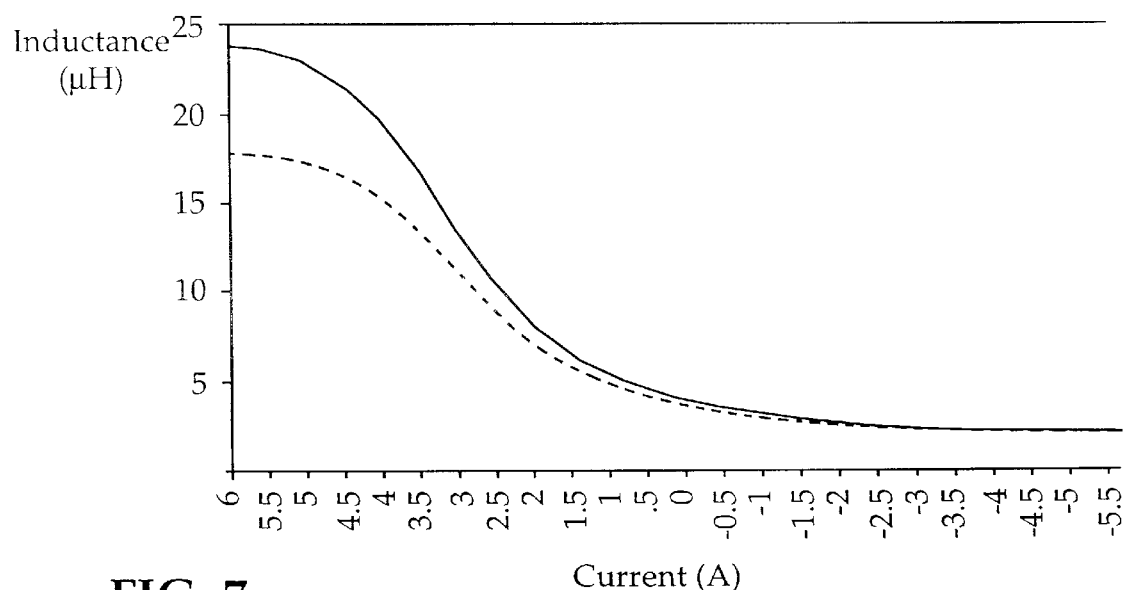
FIG. 7 shows the change produced in the current-inductance curve of the linearization coil by the solution according to the invention.
Figure 4:
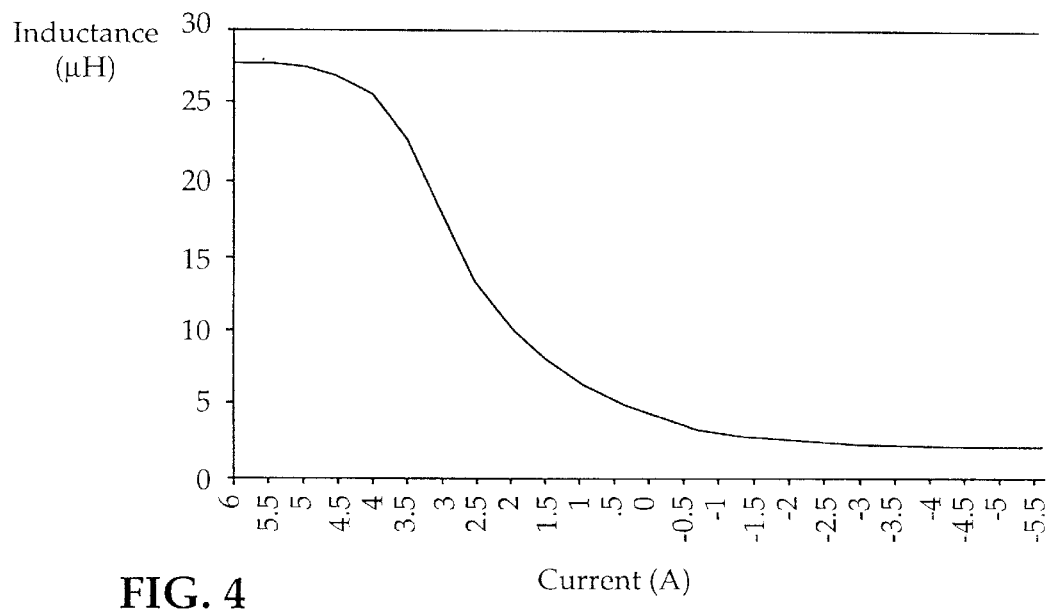
FIG. 4 shows an optimal current-inductance curve of a linearization coil.
Figure 5:
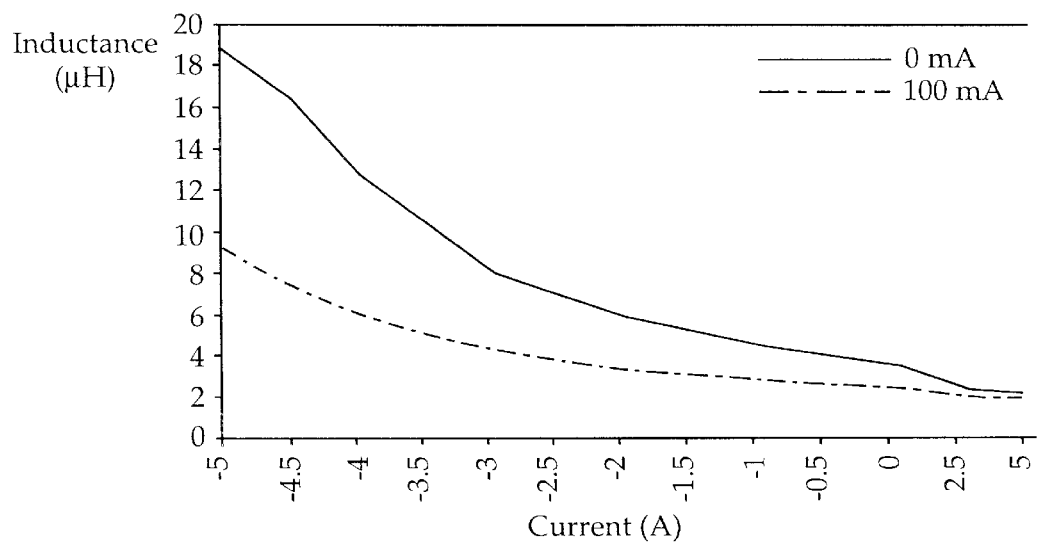
FIG. 5 shows the change produced in the current-inductance curve of the linearization coil by the solution according to the prior art.

FIG. 7 shows the effect of the solution according to the invention on the current-inductance curve of the linearization coil. The figure presents an example of measurement results from a test arrangement according to the invention. As can be seen from the figure, the effective inductance of the linearization coil can be reduced by placing a load on the control winding. The upper curve shows the dependence of the linearization coil on the current flowing through the coil when the load on the control winding is about 11 kΩ, i.e. when the load current is relatively small. The lower curve shows the current-inductance curve of the linearization coil when the terminals of the control winding are short-circuited, i.e. when the load current is relatively high. We can see that the inductance change achieved with the test arrangements of this example was about 25%.

Figure 8:
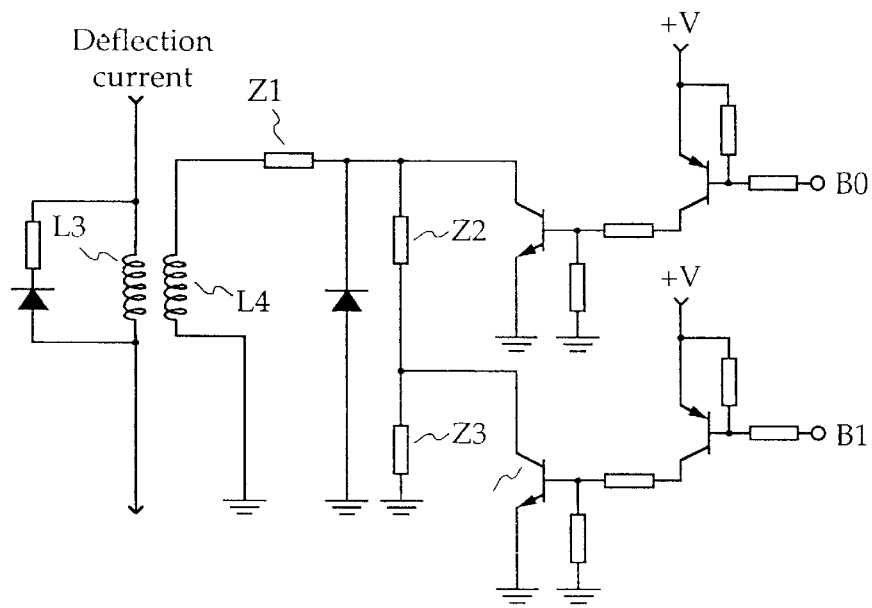
FIG. 8 shows an example circuit according to the invention by means of which the load impedance can be changed stepwise.

In an advantageous embodiment of the invention, the load impedance can be adjusted according to the line frequency. The impedance can be made changeable in fixed steps so that the selectable group of impedance values corresponds to the line frequencies used in the system. Based on the teachings hereof, it will be evident to a person skilled in the art that these impedance values can be fixed or they can be made adjustable in the final testing phase of production. It will also be evident that the selection of the impedance values can be implemented with various known mechanical or electronic switch arrangements. FIG. 8 shows an example of an electronic switch arrangement, in which control signals B0 and B1 can be used to produce an impedance formed of the sum of three fixed impedances Z1+Z2+Z3, the sum of two fixed impedances Z1+Z2 or just impedance Z1.

The impedance can also be made continuously controllable. This can be done e.g. with the circuit according to FIG. 9, where the load impedance is the sum of impedances Z1 and Zs and the (resistive) impedance of transistor T1. Impedance Zs is here a protective impedance with the purpose to limit the current flowing through transistor T1 preventing damage of the transistor.

A continuously controlled impedance can also be used to implement the above-mentioned group of discrete impedance values, in which case the memory of the microprocessor in the system contains a table of impedance values corresponding to different line frequencies, and the microprocessor gives the necessary control voltage via a D/A converter on the basis of the table.

A continuously controlled impedance can also be used to implement an automatic feedback horizontal linearity control. In such a solution according to the invention the feedback signal controls a circuit according to FIG. 9, for example. In a possible embodiment of feedback control, the system comprises a sweep current waveform measuring element, a comparison element to compare the measured waveform and the known ideal sweep waveform of the picture tube and to produce a correction signal proportional to the difference of the waveforms, and a control element to control the impedance according to said correction signal. Such a solution can be implemented by means of an A/D converter measuring the sweep current, a microprocessor and a D/A converter controlling the regulating circuit producing the impedance, in which case the comparison of the measured waveform to the known ideal waveform as well as the generation of the correction signal are performed by software in the microprocessor.

Figure 9:
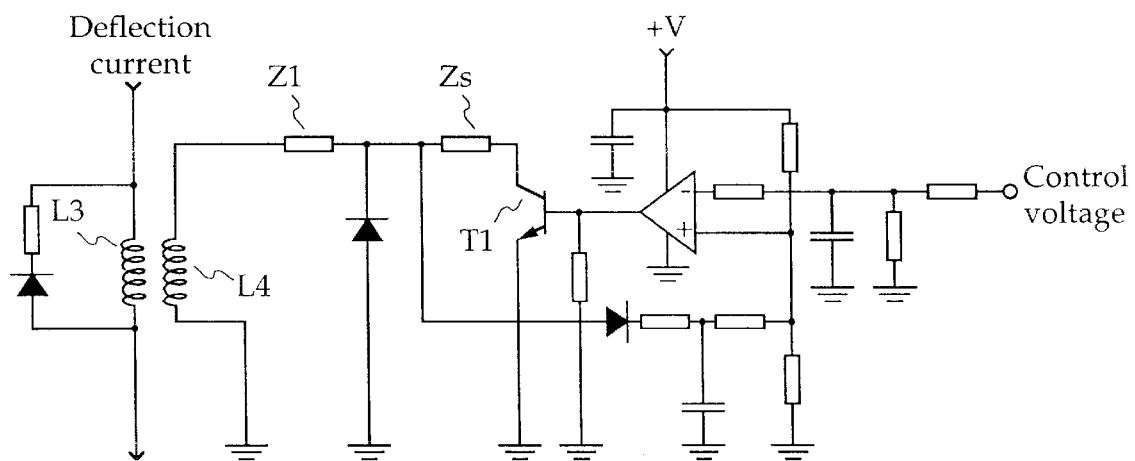
FIG. 9 shows an example circuit according to the invention by means of which the load impedance can be changed steplessly.

FIGS. 8 and 9 are examples of circuits with which the system according to the invention can be realized. Given the schematics of FIGS. 8 and 9, a person skilled in the art will know what component values are needed for these circuits to work, and therefore the component values are not specified in the figures. A person skilled in the art will also know that the circuits shown can be used to produce many variations according to the invention.

An advantage of the invention is that the shape of the current-inductance curve is not changed when the inductance of the linearization coil is changed using the system according to the invention. In addition, the invention can be implemented in a simple and economical manner. Furthermore, the solution according to the invention eliminates the need for additional coils to change the inductance of the linearization coil.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A system for correcting nonlinearity in a horizontal deflection circuit of a picture tube, comprising a horizontal deflection coil (L1) connected to a linearization coil (L3) and a control winding (L4) for controlling the linearization coil in order to change an effective inductance of the linearization coil and to linearize the horizontal deflection circuit of the picture tube at various line frequencies, characterized in that a load, which is an impedance (Z), is placed on the control winding of the linearization coil to adjust an effective inductance of the linearization coil in such a manner that a shape of a current-inductance curve of the linearization coil is substantially retained by avoiding any substantial direct current in the control winding at all said various line frequencies.

2. The system of claim 1, characterized in that said impedance is changeable.

3. The system of claim 2, characterized in that said impedance can be selected from a group of constant values.

4. The system of claim 3, characterized in that said constant values correspond to different line frequencies used on the picture tube.

5. The system of claim 3, characterized in that the constant values of said impedance can be adjusted in a testing stage of the picture tube.

6. The system of claim 2, characterized in that said impedance can be substantially continuously adjusted.

7. The system of claim 6, characterized in that an automatic impedance control element is connected to said impedance.

8. A method for correcting nonlinearities in a horizontal deflection circuit of a picture tube, wherein nonlinearity is corrected using a linearization coil (L3) and a control winding (L4) for controlling the linearization coil in order to change an effective inductance of the linearization coil and to linearize the horizontal deflection circuit of the picture tube at various line frequencies, characterized in that an effective inductance of the linearization coil is adjusted by loading the control winding with a selected impedance (Z) for avoiding any substantial direct current in the control winding at all said various line frequencies whereby a shape of a current-inductance curve of the linearization coil is substantially retained.

9. The method of claim 8, characterized in that the adjustment of said impedance comprises steps wherein a waveform of the deflection current is measured, the measured waveform is compared to an ideal waveform, for providing a control signal proportional to a difference of the waveforms, and impedance is adjusted in response to the control signal.

10. The system of claim 1, characterized in that a load, which is an impedance (Z), is placed on the control winding of the linearization coil to adjust an effective inductance of the linearization coil.

11. The method of claim 9, characterized in that an effective inductance of the linearization coil is adjusted by loading the control winding with a selected impedance (Z).

* * * * *